United States Patent [19]
Lehnert

[11] 4,098,474
[45] Jul. 4, 1978

[54] TAPE DRIVE FOR A CASSETTE IN A SOUND REPRODUCER AND/OR RECORDER

[75] Inventor: Fritz Lehnert, Gross Giesen, Germany

[73] Assignee: Blaupunkt-Werke GmbH, Hildesheim, Germany

[21] Appl. No.: 753,564

[22] Filed: Dec. 22, 1976

[30] Foreign Application Priority Data

Dec. 22, 1975 [DE] Fed. Rep. of Germany ....... 2557798

[51] Int. Cl.$^2$ .......................... G03B 1/04; G11B 15/32
[52] U.S. Cl. ..................................... 242/200; 242/204
[58] Field of Search ............................. 242/200–204, 242/186–189; 360/72; 318/190, 301–309, 313

[56] References Cited
U.S. PATENT DOCUMENTS

| | | | |
|---|---|---|---|
| 3,529,787 | 9/1970 | Bowman et al. | 242/189 |
| 3,587,997 | 6/1971 | Wood | 242/201 |
| 3,672,600 | 6/1972 | Carlson et al. | 242/186 |
| 3,938,758 | 2/1976 | Totino | 242/201 |

*Primary Examiner*—Leonard D. Christian
*Attorney, Agent, or Firm*—Flynn & Frishauf

[57] ABSTRACT

An axial-gap flat type motor with an annular permanent magnet and a non-magnetic disk rotor with a printed winding directly drives a coaxial tape capstan and indirectly drives the spindles engaging the supply and take-up reels in the cassette. The capstan and the spindles are shifted in a direction parallel to the motor axis in moving between an idle position and an operating position, the insertion of a cassette being sufficient to cause movement into the operating position. The capstan shaft accordingly is axially displaceable in the motor, shifting within the movable inner portion of a central bearing to which the rotor is affixed. The capstan shaft has radial projections engaging internal grooves in the movable bearing portion and springs urge these projections towards one or the other of their axial end positions in the bearing, corresponding respectively to the idle and operating positions of the capstan. Current is fed to the rotor by spring-pressed studs located in the central bearing and the annular permanent magnet stator. Light passing through slots in the edge of the rotor disk is optoelectrically detected to produce a speed regulating signal to a regulating circuit that controls the voltage of which current is supplied to the motor. The low moment of inertia of the drive makes the speed regulation accurate and facilitates transitions into and out of fast-forward and fast-rewind modes. The printed windings on the rotor produce smooth motion in response to direct current excitation.

20 Claims, 7 Drawing Figures

TAPE DRIVE FOR A CASSETTE IN A SOUND REPRODUCER AND/OR RECORDER

This invention relates to a tape drive for a magnetic tape cassette recorder or player.

Such a drive is expected to provide the best available sound recording and reproduction quality. This objective requires the greatest possible uniformity of running of all parts of the drive device, since even tiny variations in speed produce sound pitch wavering that is observed as a disturbing effect.

Especially for those tape recorders and players designed for installation in an automobile or incorporation in a hand-portable radio and music device, there is only very little space available for the magnetic tape device, so that a highly compact construction utilizing as few components as possible is required. The trend in recent years towards the provision of highly compact apparatus for this purpose, however, does not permit neglect of the quality of smooth running nor of the value of well-regulated drive speed.

In the known drives for magnetic tape cassette sound recording and reproducing apparatus, the power is usually provided by a motor, as a rule a 3-T armature motor, and delivered by a drive belt or friction wheels to a flywheel in the form of a disk and that is mounted concentrically with the capstan shaft that drives the tape when an idler wheel presses the tape against the shaft. This flywheel forces the capstan shaft to turn with a constant angular velocity and should accordingly have a moment of inertia as high as possible. Sometimes drives are used that provide two simultaneously running and equally large drived flywheels, an arrangement that is more immune to external disturbing influences.

The tape drive components must be manufactured with high precision and hence at great expense, in order to avoid irregularities in the driving of the tape which cause modulation of the useful frequencies of the tape by sum and difference frequency formation through characteristics of the drive, for example out-of-roundness, resonant frequencies, bearing problems, aging and temperature.

In known drives, the belt between the drive motor and the flywheel, in addition to functioning to transfer force, also functions as a damping member interposed between motor and capstan shaft. Good belts in general provide a satisfactory damping factor with respect to steady state conditions. Certain variations in torque at the capstan shaft, that can take place practically as a stepfunction, for example as the result of an improperly wound cassette, impose very high requirements on the belt with reference to its stiffness/expandibility characteristic, if the belt is to provide a largely delay-free transmission of the stepfunction to the motor and then to make possible after the initiation of a regulating operation, a responsive action on the capstan shaft to compensate for the disturbing factor. A good damping behavior and a delay-free force transmission with reference to more or less rectangular functions are two requirements that the known belt drives must face. Their simultaneous satisfaction is physically not possible.

It is an object of the present invention, therefore, to develop a drive based on an entirely different concept from those of the drives heretofore known and to provide a drive that is not subject to the above-described disadvantages.

SUMMARY OF THE INVENTION

Briefly, a direct current motor of flat construction, which is to say of short axial dimension, is used as the drive motor and its shaft itself serves as the capstan shaft for the magnetic tape, while the movable parts of the drive motor have as little moment of intertia as possible. In accordance with the invention, this is accomplished by making the movable parts of the drive motor of non-magnetic material. A take-up spindle is driven through a slip coupling and at least one drive belt. The slip coupling, if not provided in the spindle, can be incorporated in the motor.

In this arrangement a mere current reversal can reverse the direction of rotation of the drive motor to provide a fast rewind. In the fast rewind mode, a shiftable idler wheel is preferably put into effective connection between the take-up spindle and the pay-out spindle respectively engaging the cassette hubs. The capstan shaft take-up and pay-out spindles are preferably mounted on a movable platen, and the motor may also be mounted thereon. Alternately, all of these drive components can be mounted on a fixed chassis.

The chassis itself may provide the bottom plate for the drive motor to reduce the bottom plate for the drive motor to reduce the axial dimension of the device.

The capstan shaft is preferably shiftable axially in the drive motor and this is provided by a central bearing having a hollow rotatable inner portion portion driven by the rotor and grooves into which radial projections of the shaft are slidably engaged, while springs bearing against these projections serve to define the end positions of the shaft.

The rotor of the flat type drive is of disk shape and is composed of at least one insulating disk with applied conducting paths, such as printed paths. These paths preferably run in a radial direction in the portion of the disk that is close to the permanent magnet structure of the motor, which typically is a multipolar ring magnet. Current is provided to the rotor by contact sliders that are spring pressed against the rotor disk.

Preferably a sensor is provided in the motor to generate a regulating signal that depends upon the speed of rotation of the rotor and, preferably, this arrangement involves an optoelectronic system utilizing a light ray intermittently passing through slots in the periphery of the rotor and reflected back to a photoelectric element by a reflection surface on the other side of the rotor.

The invention has the decisive advantage that intermediate mechanical members such as belts, pulleys, guides for idler roller, and flywheets are completely dispensed with in the power transmission chain to the transport shaft, so that disturbing forces and regulating forces are effective at the same location and, furthermore, because of the small moment of inertia of the motor, compensative regulation takes place immediately upon the occurrence of the disturbence.

The drive according to the invention is distinguished, furthermore, by an inherently silent type of operation and a higher efficiency. A further advantage of the invention is that for transitions between fast-forward and fast-rewind operation, it is necessary merely to switch the polarity of the current supply to the motor.

Finally, compared with conventional drives, the new drive provides a saving of components and thereby makes possible saving of space. The drive provided by the present invention also has a higher service life expectancy.

The invention is further described by way of illustrative example with reference to the accompanying drawings, in which.

Figure 1:
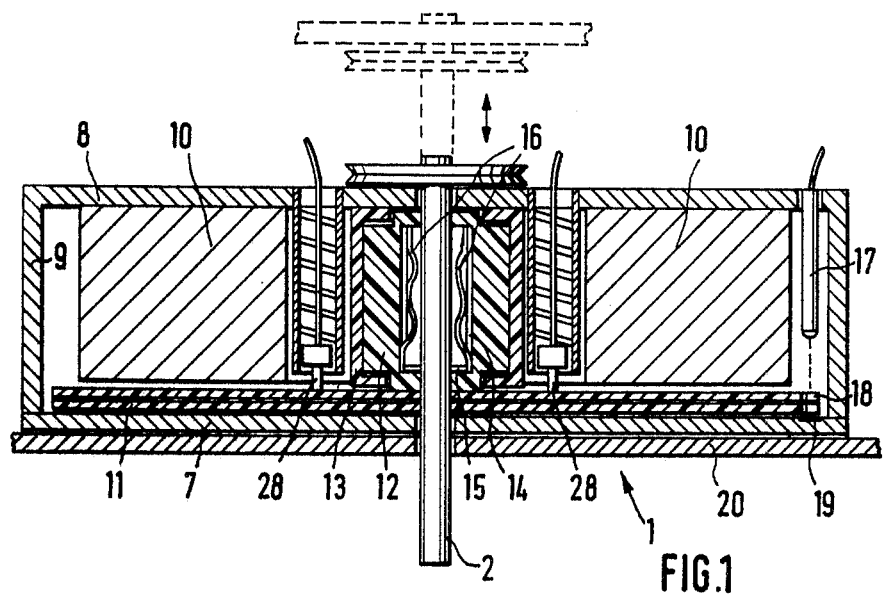
FIG. 1 is a cross-section of a drive motor in a plane passing through its axis.

The principal components of the tape drive are a drive motor 1 with an axially shiftable capstan shaft 2, a take-up spindle 3, a pay-out spindle 4 and between those two, an idler wheel 5. A pressure wheel 55 for pressing the tape against the capstan 2 when the motor is running in the record/play condition is shown only in dashed lines in FIG. 2 because the mounting for this conventional element has not been shown in order not to complicate the illustration. The axles 23 (FIG. 2) of the take-up and pay-out spindles 3 and 4 are axially fixed but rotatably mounted in a vertically shiftable frame 6. Similarly fixed axially and rotatably mounted in the frame 6 is one end of the axially shiftable shaft 2 of the drive motor 1. The frame 6 is connected with known control means that bring it into an operating position in response to the insertion of a cassette, as disclosed, in a number of different forms, for example, in U.S. Pat. No. 3,350,385 to Horst Rubi, owned by the assignee of the present invention.

FIG. 1 shows an illustrative example of the drive motor 1 with its axially shiftable shaft 2. This motor is a direct drive motor built in an extremely flat shape and is of the type characterized by the name of axial air-gap motors.

The drive motor 1 has a round bottom plate 7 and a cover plate 8, which are connected together at their respective peripheries by a surrounding cylindrical sidewall 9. In the enclosed space is a multipolar permanent magent 10 that is affixed to the cover plate 8, the cover plate 8 serving thus also as the magnetic return path. Accordingly, the bottom plate 7, the cover plate 8 and the sidewall 9 are made of a material with good magnetic conductivity. The thickness (axial dimension) of the permanent magnet 10 is chosen in such a way that it reaches all the way to a thin annularly cylindrical air-gap coaxial with the annular magnet 10 and with the shaft 2. A disk shaped rotor 11 is coaxially situated in this air-gap, fixed to a bearing member 12 and rotatable with the shaft 2 because of the fact that the shaft 2 is keyed to the bearing member 12, as explained below.

Figure 6:
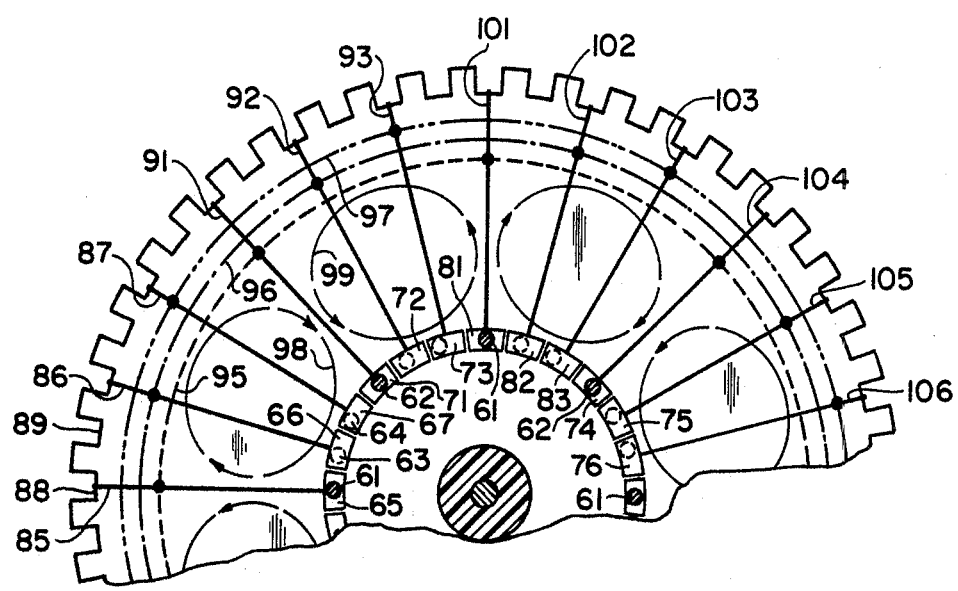
FIG. 6 is a diagrammatic plan view of the rotor of the drive motor of FIG. 1.

If it should be necessary in a particular case to reduce the axial dimension of the drive motor 1 further, the bottom plate 7 can be omitted, so that the sidewalls 9 are mounted directly on the chassis plate 20, in which case it is necessary for the chassis plate 20 to be made of magnetically conducting material, as illustrated in FIG. 6, by the chassis plate 20a.

Figure 7:
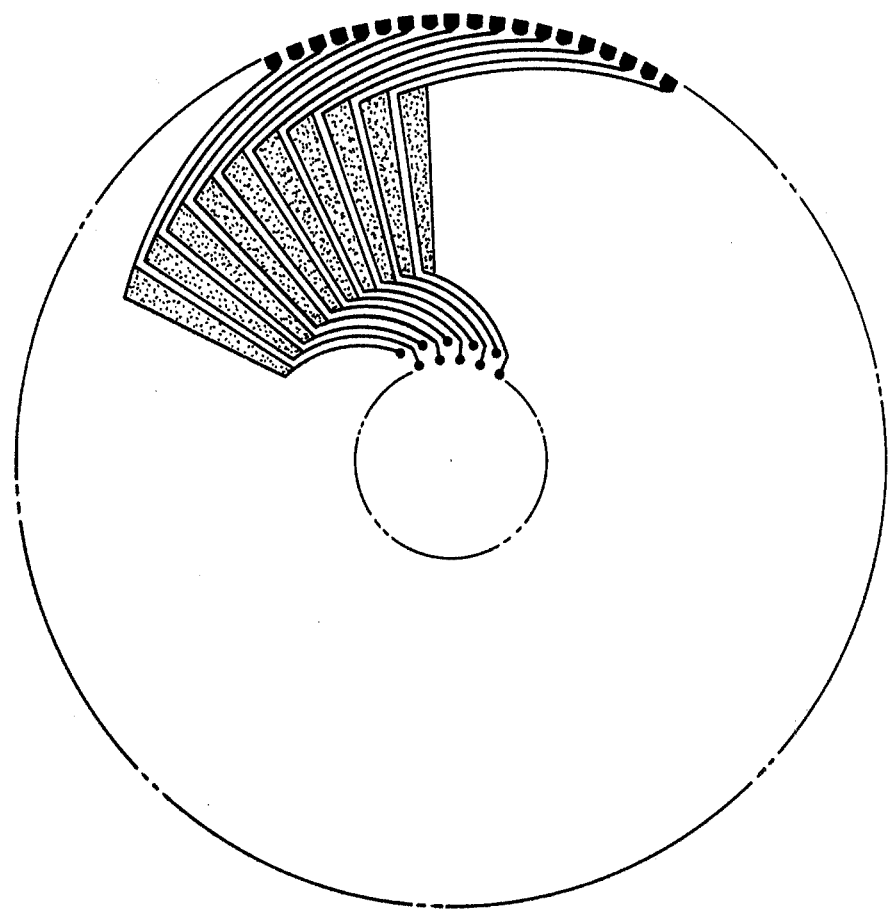
FIG. 7 is a plan view of a practical embodiment of the rotor of the drive motor of FIG. 1.

The disk shaped rotor 11 carries conducting paths that run parallel to each other and are insulated from each other, preferably for parallel paths, as shown in FIG. 7. In this case, this is obtained by compressing into a single rotor two thin conductor-carrying insulation plates patterned on both sides, with an insulating film placed between them. Even with precautions to provide for sufficient inherent stability of the conducting disks, it is possible to keep the thickness of the composite rotor disk below 1 mm.

As shown in FIG. 7, the individual conducting paths on the conductor bearing films are connected to each other in such a way that as a whole, they form a continuous progressive winding and they are so disposed that radially running conductor sections are found in the magnetically active region and thus make possible a strong electrodynamic effect.

By using a non-magnetic rotor disk and an annular permanent magnet 10, it is possible to obtain a geometrically plane and magnetically constant air-gap, without resort to auxiliary means or devices, since by the distribution of the winding over the rotor disk and the absence of magnetically conducting rotor material, a magnetically smooth armature is produced. Thus, stray magnetic fields are reduced to a minimum and magnetic vibrations and torque modulations are completely suppressed, in contrast to their inherent presence in the case of conventional direct current motors.

FIG. 7 shows the arrangement of the conducting paths on the rotor disk 11, together with a cross-section of the contact pins 61,62 and the bearing hub 12 in the plane VII—VII of FIG. 6. There is here illustrated a rotor for an 8-pole magnet. In this case, eight contact pins are necessary, four pins 61 connected to one side of the current supply alternating in sequence with four pins 62 connected to the other side of the supply. If desired, additional pins can be provided, with the pins 63 and 64, for example, being connected in common with the adjacent pin 61 (or these 3 pins could be replaced by a brush).

All of the radial current paths in the rotor of FIG. 7 are on the top layer surface of the rotor, as are also, of course, the commutator segments 65,66,67, 71–76, 81,82,83 and others in the rotor portion broken away in this view. The radials, at their outer extremities, are connected down and around, through an indentation in the rotor rim for example the indentation 88, to a circumferential conductor lying on a lower surface of the rotor sandwich, a short distance radially inward from the indentation. The three circumferential conductors 95,96 and 97 are preferably at respectively slightly different distances from the axis of the rotor, exaggerated in the drawing, the ring conductors nearer the rotor top being farther inward to equalize the path lengths from the commutator segments to the ring conductors. These circumferential conductors 95,96 and 97 are shown in differently broken lines to indicate that they lie at different levels, 95 being nearest the top and 97 on the bottom. Actually, the circumferential conductors can be given a scalloped or wavy shape instead of the circular shape shown, coming outwards to the proper rim indentations to meet the corresponding radial paths folded around the rim, instead having the radials extended inwards over the small distance necessary to reach the circular conductor.

It will be seen that radials 88,91,101 and 104, and so on, are connected to circumferential conductor 95, radials 86,96,102 and 105 are connected to circumferential conductor 96, and radials 87,93,103 and 106 are connected to circumferential conductor 97. Directional loops 98 and 99 and so on indicate the way the current flows when the pins 61,62, as shown in FIG. 7, make contact with the commutator segments connected to the circumferential conductor 95. Similar loops slightly displaced would correspond to the other set of radials.

In FIG. 7, twice as many rim indentations 88,89, etc., are shown as there are radials. To use all the indentations for radial conductors, so as to double the number of radials, would require the provision of three additional levels for circumferential conductors, so as to avoid interference between different loops, or else doubling the number of magnet poles in the magnet 10 and of commutator segments on the rotor. By such techniques, preferably the latter, the radials may be packed densely as well as evenly in the circumferential dimension of the rotor.

Opposite the lower end surface of the permanent magnet 10, there are only radially-running conductor paths moving in the adjacent non-magnetic gap. These are perpendicular to the magnetic lines of force in the gap and are thus optimally disposed for generation of rotary mechanical force. The circumferential current paths and the folded over portions of the radials are all near the outer edges of the disk outside of the concentration of magnetic lines of force. It therefore makes no difference that the components of driving force are reduced on these outer portions of the conductor loops.

High efficiency is obtained because of the favorable disposition of the magnetic field. Compared to conventional motor constructions which provide wires in grooves and partly in insulation, the removal of heat is more favorable, so that for the same power it is possible to get by with a smaller amount of copper. As the result of all these features, as well as of the extremely low mass of the rotor disk, there is provided a rapid acceleration up to running speed and hence a good regulation characteristic. The even distribution of the winding circumferentially provides a linear torque-speed characteristic.

On the inside of the annular permanent magnet there are arranged, preferably symmetrically to the central axis of the drive motor 1, two contact riders 28 resiliently making contact to the rotor disk. These are connected by conducting leads to the poles of a voltage source to energize the motor. Since the contact rods 28 touch the disk at a relatively small radius from its center, the circumferential velocity at this point is small for a given angular velocity and a long useful life is thus provided for these elements of the motor.

As already mentioned, the rotor disk is affixed to a bearing member 12. This fastening determines the position of the rotor disk in the axial direction, in addition to centering the disk. The bearing member 12, in combination with a bearing casing 13, together form a bearing of synthetic material, for example nylon, that is preferably self lubricating. The selection of this kind of bearing avoids the risk of undesirable oiling of the motor shaft 2 that is at the same time the capstan shaft for the tape, a risk that would exist if the bearing 12,13 were a sintered oil filling bearing.

The bearing core 12 has a core in it in which the motor shaft that serves as the tape capstan 2 is axially shiftable. For the purpose of axial displacement, the grooves 14 in the bearing core 12 act as guides for radial projections 15 with which the shaft 2 is equipped. The two end positions of the shaft 2 are fixed by means of springs 16 that are arranged between the bearing core 12 and the shaft 2 and exert axial force on the projections 15, urging them to an end position when an end position is approached.

A regulating signal for keeping the motor speed constant is obtained by means of optoelectronic semiconductor elements and a cooperating reflector. A measuring device with a photodiode and a receiver transistor is located in a small casing arranged between the outer rim of the permanent magnet 10 and the enclosing sidewall 9. Light rays issuing out from the photodiode pass through the slots of the outer rim, of the rotor disk to fall upon a reflection surface 19 on the bottom plate 7 and then travel back to the receiver transistor. The slots 18 are preferably present in any event, for the purpose of providing effective through-contact in the rotor structure, so that the feature just mentioned takes advantage of their presence to accomplish a further function of producing a signal having a frequency of variation proportional to the circumferential velocity of the rim of the disk, and hence proportional to the angular velocity of the rotor.

Figure 2:
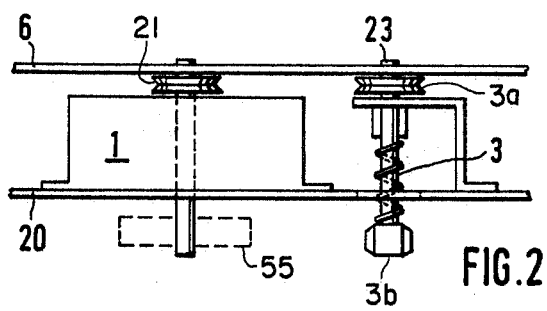
FIG. 2 is a side elevation view of a drive mechanism according to the invention in the operating position.

FIG. 2 shows diagrammatically the arrangement of the drive motor and of the take-up drive spindle 3 on a chassis 20. Power is transferred to the take-up spindle 3 from the shaft 2 of the drive motor 1 that at the same time operates as the tape capstan of the drive, over a belt pulley 21 and a drive belt 22 (FIG. 4) to a pulley 3a on the axle 23 that carries the core 3b (FIGS. 2 and 3) that is inserted into one of the bearings of the cassette in the operating position of the drive (FIG. 2). Because the angular velocity of take-up varies, while the speed of tape transport is uniform, it is necessary to provide a slip coupling between the tape capstan 2 and the take-up spindle 3. This is conventionally provided in the take-up spindle structure 3 and since that is well known, it is not shown in the present drawings, in order not to complicate the illustration.

As already mentioned, axle 23 of the take-up spindle 3 is rotatably mounted in the frame 6 in such a way as to fix its axial position, as is also the shaft 2. Similarly, the axle 44 of the payout spindle 4, which appears in FIG. 4 but is not visible in FIGS. 2 and 3 because it is directly in line with the device 3, is similarly mounted in the frame 6. An elongated hole 24 provides a sliding guide in the frame 6 for the axle 50 of an idler wheel 5. In the illustrated embodiment, the frame 6 is movable vertically and for that purpose it operates as part of a spring-loaded mechanical system, not shown in the drawing, that works to shift the frame 6 vertically at the time of insertion or the ejection of a cassette. Systems of that sort are illustrated in the above mentioned U.S. Pat. No. 3,850,385 owned by the assignee of the present invention.

Figure 5:
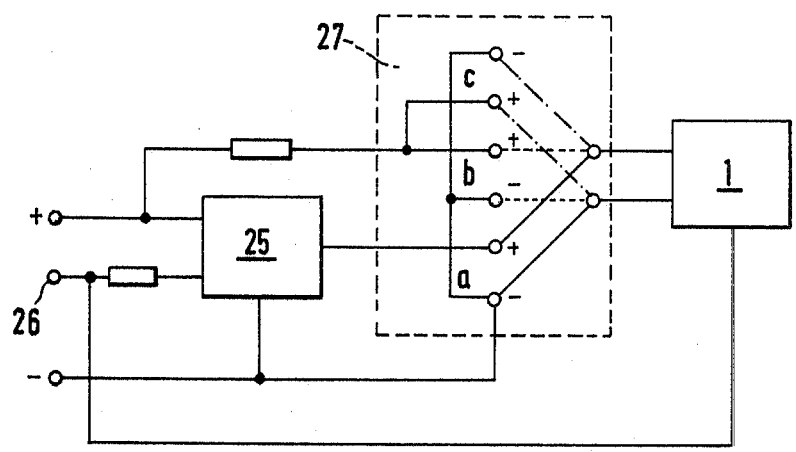
FIG. 5 is a block diagram of a circuit for switching the drive between three modes of operation and for providing speed regulation in the play/record mode.

FIG. 5 is a diagram of the motor control circuit. A regulating circuit 25 is mounted on the chassis 20 and serves to control the speed of the motor 1 in response to the optoelectronic semiconductor element in the casing 17 shown in FIG. 1, of which the receiving transistor output is connected to the control input 26 of the regulating circuit 25. The regulating circuit 25 is of the known kind that generates a voltage representive of the pulse rate of input pulses, compares that voltage with a reference voltage to derive an error signal and utilizes the error signal to modify the voltage at which current is supplied to the motor in the sense necessary to keep the motor speed constant. The output of the circuit 25 is connected to a pair of terminals in the changeover switch 27 to which the input of the motor 1 may be connected.

OPERATION OF THE DRIVE

Figure 3:
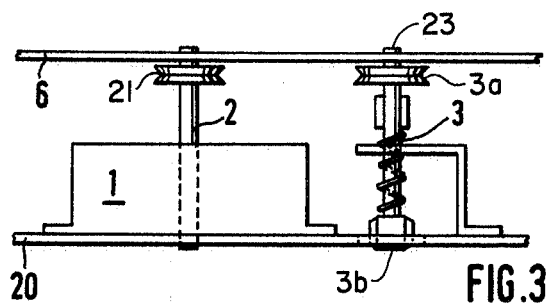
FIG. 3 is a side elevation view of the drive of FIG. 2 in the standby position.
Figure 4:
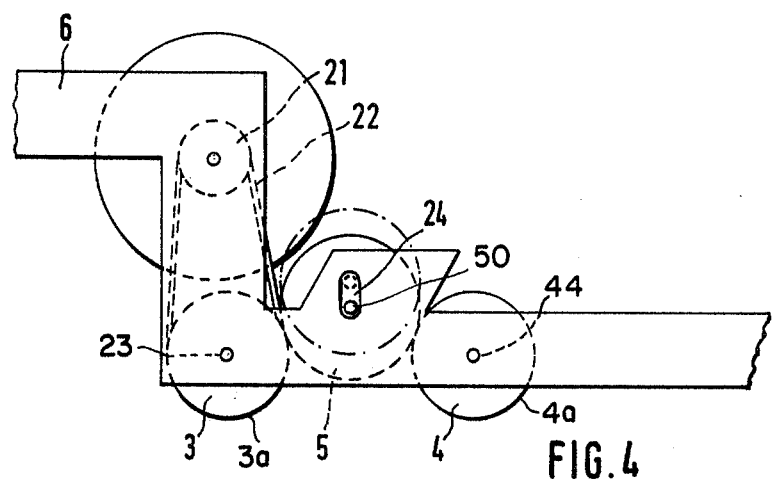
FIG. 4 is a plan view of the drive drain for the spindles.

It is assumed that initially the frame 5 is in its upper or standby position illustrated in FIG. 3 and that the cassette insertion space is empty.

The insertion of a cassette causes the frame 6 to drop down by means of the previously mentioned known control system, as the result of which it soons ends up in the operating position illustrated in FIG. 2, in which shaft 2 and the take-up and pay-out spindles on their respective shafts all penetrate to the inside of the cassette, which is also in its operating position, and the motor 1 is switched into operation. The changeover switch 27 is then put into the play-back position "a" indicated in FIG. 5 and in consequence the exposed stretch of magnetic tape of the cassette is pressed against the transport capstan shaft 2 by the pressure roller 55 (FIG. 2) and is thereby set into motion and is played back as it passes by the playback head (not shown).

The same mechanical events occur when a recording operation is begun, but, as is well known, in a device equipped for recording there is electrical switching between the recording and playback heads and circuits and an erase head is activated. If the torque load on the capstan 2 should now be subject to sudden changes, whether on account of the cassette because of an irregularly wound up tape therein, or as the result of manufacturing tolerances on the winding up of the cassette, or whether this occurs in the motor as the result of variations in current, these changes are instantly registered by the measurement device (speed sensor 17) and provided in a signal to the input 26 of the regulating circuit 25, which responds by causing an increase or decrease of the voltage supplied to the drive motor 1. It is thus seen that, unlike in the conventional drives, there are no mechanical intermediate devices involved that would prevent an instant regulatory response to differences in the load on the motor.

Although the insertion of the cassette preferably causes the change-over switch 27 to take the position "a" as already mentioned, a manual control (not shown) is provided, as usual, for the switch 27, by which the switch can be put in the position "b" for "fast forward" operation or in the position "c" for "fast rewind" operation. In "fast rewind", not only is the voltage applied to the motor higher than in position "a", as is also the case in position "b", but the polarity with which the current is supplied is reversed. Furthermore, the effect of reversing the direction of rotation of the drive motor 1 results in shifting the axial of the idler wheel 5 so that it forms a power-transfer coupling between the wheels 3a and 4a of the spindles engaging the cassette hubs, the normal pay-out spindle 4 now operating as the take-up spindle during rewind.

Although the invention has been described with reference to a particular illustrative embodiment, it will be understood that variations are possible within the inventive concept. For example, the plate 20 may be vertically movable and frame 6 may be stationary instead of vice-versa. Furthermore, the advantages of the low-inertia drive provided by the flat-type motor construction could be used without the feature of the axially shiftable shaft 2 in a system in which the motor is mounted on the movable frame 6 or on a system in which the motor, capstan and spindles are fixed and the cassette is moved axially to engage the spindles and capstan.

As another example of a modification, instead of the belt drive between the shaft 2 and the take-up spindle 3 a friction wheel drive may be used.

I claim:

1. Tape drive for a magnetic tape cassette record and/or player having both steady speed and low inertia, as well as small axial dimensions, comprising in combination:

a direct current motor of the axial air-gap type having an annular multipolar permanent magnet stator and a substantially disc shaped rotor of non-magnetic material and a shaft concentric with and driven by said rotor having an extension disposed and shaped as a tape transport capstan;

means, including take-up and pay-out spindles for insertion in a cassette and a pressure roller facing said capstan, for driving of tape contained in the cassette past at least one magnetic transducer head at a rate determined by the rotation rate of said shaft, all of the movable portions of said motor, shaft, and driving means having low moment of inertia, and means, including features at or near the periphery of said rotor and non-rotary elements fixed in said motor at locations suitable for cooperation with said features of said rotor, for generating an electric signal of a frequency proportional to motor speed for use by a motor speed regulating circuit.

2. A tape drive as defined in claim 1, in which said driving means includes a friction wheel drive connection and a slip coupling for driving one of said spindles as a take-up spindle by the force of said motor.

3. A tepe drive as defined in claim 1, in which said driving means includes at least one drive belt (22) and a slip coupling for driving one of said spindles as a take-up spindle (3) by the force of said motor.

4. A tape drive as defined in claim 1, which also comprises means for reversing the polarity of the current supplied to said motor and in which said driving means comprises a slip coupling for driving one of said spindles as a take-up spindle (3) by the force of said motor and also an idler wheel (5) having a laterally shiftable axle and in which there are also provided means for shifting the axle of said idler wheel in response to the placing of the tape drive in the fast rewind mode upon operation of said means for reversing supply current polarity, to engage wheels (3a,4a) or rollers respectively affixed to said spindles (3,4) for transfer of rotary motion force between said spindles and for shifting the axle of said idler wheel (5) to disengage the idler wheel in response to the tape drive being taken out of the fast rewind condition.

5. A tape drive as defined in claim 1, in which the drive motor (1) is mounted on a chassis (20) a portion of which serves as the bottom plate for the motor casing and is made of magnetically conducting material.

6. A tape drive as defined in claim 1, in which said disk shaped rotor (11) is constituted of a least one thin insulating plate on which conducting paths are printed.

7. A tape drive as defined in claim 6, in which said conducting paths run radially in the annular portion of said disk which is within the same radial distance range from the motor axis as the annular permanent magnet serving as the stator of the motor.

8. A tape drive as defined in claim 7, in which, in the space enclosed by the said annular permanent magnet (10), resiliently urged contact members are provided which ride on respective contact areas of said rotor (11).

9. A combination of a tape drive as defined in claim 1, with electronic speed regulating means (25) having an input connected to one of said elements in said motor for generating an electric signal of a frequency proportional to motor speed so as to receive said signal, said speed regulating means being constituted to operate in response to said electric signal to control the voltage at which current is supplied to the rotor of the motor in such a way as to maintain the rotor speed constant.

10. A tape drive as defined in claim 1, in which said non-rotary elements fixed in said motor for cooperation with features at or near the periphery of said rotor for generating an electric signal of a frequency proportional to motor speed are a light source and a photoelectric device cooperating with said rotor to provide an optoelectronic signal generating system.

11. A tape drive as defined in claim 10, in which said features at or near the periphery of said rotor are a series of openings circumferentially disposed at or near the edge of the rotor and in which said fixed elements also include means for reflecting light received through said openings from said light source back through one of said openings to said photoelectric device, said photoelectric device being adjacent to said light source.

12. Tape drive for a magnetic tape cassette recorder and/or player having both steady speed and low inertia, as well as small axial dimension, comprising in combination:

a direct current motor of the axial air-gap type having an annular multipolar permanent magnet stator and a substantially disc shaped rotor of non-magnetic material having a rotor-supporting shaft and a second shaft concentric with said rotor-supporting shaft, said second shaft being mounted so as to be shiftable axially with respect to said rotor and slidably keyed to the rotor-supporting shaft so as to be driven by said rotor and having an extension disposed and shaped as a tape transport capstan;

means, including axially shiftable take-up and pay-out spindles for insertion in a cassette and a pressure roller facing said capstan extension of said second shaft, for driving of tape contained in the cassette past at least one magnetic transducer head at a rate determined by the rotation rate of said second shaft, said spindles being parallel to said second shaft, and means for causing and requiring said spindles to be axially shiftable together in common with axial shift of said second shaft, thereby providing for movement of said tape drive between an idle position and an operating position, all the movable portions of said motor having low moment of inertia.

13. A tape drive as defined in claim 12, in which axial shiftability of said second shaft with respect to said rotor is provided by the combination, within the structure of said motor of:

a central bearing inside and coaxial with said stator, having an internal movable portion and an external fixed portion, said rotor being affixed to said movable internal portion of said central bearing, said movable internal portion of said bearing being hollow and provided with grooves running parallel to the axis of said movable portion of said bearing, and radial projections (15) provided on said second shaft slidably engaged in said grooves (14) for confining the relative movement of said second shaft and said movable part of said bearing to relative displacement in an axial direction.

14. A tape drive as defined in claim 13, including spring members (16) in the hollow portion of said movable portion of said bearing for urging said projections (15) of said second shaft axially towards an end position abutment in said bearing 15. A tape drive as defined in claim 12, in which said driving means includes a friction wheel drive connection and a slip coupling for driving one of said spindles as a take-up spindle by the force of said motor.

16. A tape drive as defined in claim 12, in which said driving means includes at least one drive belt (22) and a slip coupling for driving one of said spindles as a take-up spindle (3) by the force of said motor.

17. A tape drive as defined in claim 12, in which said disc shaped rotor (11) is constituted of at least one thin insulating plate on which conducting paths are printed and in which said conducting paths run radially in the annular portion of said disc which is within the same radial distance range from the motor axis as the annular permanent magnet serving as the stator of the motor and, in the space enclosed by the said annular permanent magnet (10), resiliently urged contact members ride on respective contact areas of said rotor (11).

18. A tape drive as defined in claim 12, comprising also speed regulating means (25) responsive to an electrical signal representative of the speed of the rotor of the motor for controlling the voltage at which current is supplied to the rotor of the motor in such a way as to maintain the rotor speed constant, and means for generating an electrical signal having a characteristic proportional to motor speed composed of features at or near the periphery of said rotor and a sensor device in a nonrevolving position in said motor adjacent to said rotor for producing said signal in response to passage of said features past said sensor device, said sensor device having an output connected to a control input (26) of said speed regulating means.

19. A tape drive as defined in claim 18, in which said features of said rotor are openings circumferentially disposed at or near the edge of the rotor, and in which there are provided, within said motor structure, means for radiating light through said openings and means for reflecting light so radiated towards said light radiating means, and in which said sensor is located adjacent to said light radiating means for generating said electrical signal in response to light so reflected, whereby said electrical signal is produced in a manner giving it a frequency proportional to motor speed.

20. A tape drive as defined in claim 12, which also comprises means for reversing the polarity of the current supplied to said motor and in which said driving means comprises a slip coupling for driving one of said spindles as a take-up spindle (3) by the force of said motor, an idler wheel (5) having a laterally shiftable axle and means for shifting the axle of said idler wheel in response to the placing of the tape drive in the fast rewind mode upon operation of said means for reversing supply current polarity, and wheels (3a,4a) or rollers respectively affixed to said spindles (3,4) for transfer of rotary motion force between said spindles for shifting the axle of said idler wheel (5) to disengage the idler wheel in response to the tape drive being taken out of the fast rewind condition.

* * * * *